United States Patent [19]

Irimajiri et al.

[11] Patent Number: 4,573,546
[45] Date of Patent: Mar. 4, 1986

[54] THREE-WHEELED MOTOR VEHICLE

[75] Inventors: Shoichiro Irimajiri, Mie; Katsusuke Komuro; Kunihiko Aikawa, both of Tokyo, all of Japan

[73] Assignee: Honda Giken Kogyo Kabushiki Kaisha, Tokyo, Japan

[21] Appl. No.: 605,403

[22] Filed: Apr. 30, 1984

[30] Foreign Application Priority Data

| Apr. 28, 1983 | [JP] | Japan | 58-73741 |
| Apr. 28, 1983 | [JP] | Japan | 58-73742 |
| Apr. 28, 1983 | [JP] | Japan | 58-73743 |
| Apr. 28, 1983 | [JP] | Japan | 58-73744 |
| Apr. 28, 1983 | [JP] | Japan | 58-63056[U] |
| Apr. 28, 1983 | [JP] | Japan | 58-63057[U] |
| Apr. 28, 1983 | [JP] | Japan | 58-63060[U] |

[51] Int. Cl.[4] ........................ B62D 21/00; B62D 61/06
[52] U.S. Cl. .................... 180/89.1; 180/211;
280/5 A; 280/62; 296/1 S; 296/146; 296/151;
296/185; D12/85; D12/90
[58] Field of Search ............ 180/89.1, 89.17, 314,
180/211; 220/1 V; 280/5 A, 62; 296/1 S, 31 P,
146, 151, 185; D12/85, 90

[56] References Cited

U.S. PATENT DOCUMENTS

| D. 150,161 | 7/1948 | Sanmori | 296/146 X |
| D. 248,461 | 7/1978 | Edmonson | D12/85 |
| D. 262,871 | 2/1982 | Powers | D12/85 |
| D. 274,995 | 8/1984 | Richards | D12/85 |
| 2,054,951 | 9/1936 | Saives | 296/151 |
| 2,699,355 | 1/1955 | Kavanaugh | 296/151 X |
| 2,725,944 | 12/1955 | Lee et al. | 296/1 S X |
| 2,761,523 | 9/1956 | Lee | 280/5 A X |
| 2,785,921 | 3/1957 | Barenyi | 296/146 X |
| 2,888,296 | 5/1959 | Huggins | 280/5 A X |
| 3,672,718 | 6/1972 | Broyer | 296/1 S |

FOREIGN PATENT DOCUMENTS

| 200516 | 12/1955 | Australia | 180/89.17 |
| 915186 | 7/1949 | Fed. Rep. of Germany | 296/1 S |

Primary Examiner—Robert G. Nilson
Attorney, Agent, or Firm—Lyon & Lyon

[57] ABSTRACT

A three-wheeled motor vehicle has a vehicle body on which two front wheels and a single rear wheel are rotatably mounted. The vehicle body includes a front portion covering the two front wheels and having a wide and flat shape, and a rear portion having a driver's compartment and covering the rear wheel, the rear portion being narrower than the front portion and progressively higher in a rearward direction of the vehicle body. The front and rear portions of the vehicle body include slanted continuous side surfaces tapered toward a longitudinal axis of the vehicle body in the rearward direction thereof.

7 Claims, 16 Drawing Figures

THREE-WHEELED MOTOR VEHICLE

BACKGROUND OF THE INVENTION

The present invention relates to a three-wheeled motor vehicle, and more particularly to a body configuration for such a motor vehicle. There has been a strong demand in recent years for automobiles which can easily be driven by anybody and are of good fuel economy.

Automobiles that can easily be driven by anybody should not fall over of their own accord, or stated otherwise, should be other than one-wheeled or two-wheeled vehicles that require a certain level of driving skill on the part of the driver so as to be maneuvered well. This invention relates to three-wheeled motor vehicles which are the least number of wheels possible for stably supporting the vehicle on ground. For better fuel economy, the vehicle should be light in weight and have a small aerodynamic drag. Good mileage therefore hinges largely on how to design the shape of a vehicle body. This invention there is provided a vehicle body of a configuration which has a small frontal projection area and a small cross-sectional change while ensuring a reasonable, necessary and sufficient vehicle compartment space, and which is as streamlined as possible.

SUMMARY OF THE INVENTION

Based on the foregoing fundamental concept, it is an object of the present invention to provide a three-wheeled motor vehicle having a small aerodynamic drag.

According to the present invention, there is provided a three-wheeled motor vehicle comprising a vehicle body, two front wheels rotatably mounted on the vehicle body, a single rear wheel rotatably mounted on the vehicle body, an engine disposed on the vehicle body between the front wheels, and a compartment defined in the vehicle body, the vehicle body including a front portion covering the engine and the front wheels and a rear portion disposed behind the front portion and covering the compartment and the rear wheel, the front portion having a relatively wide and flat shape and the rear portion being narrower than the front portion and progressively higher in a rearward direction.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
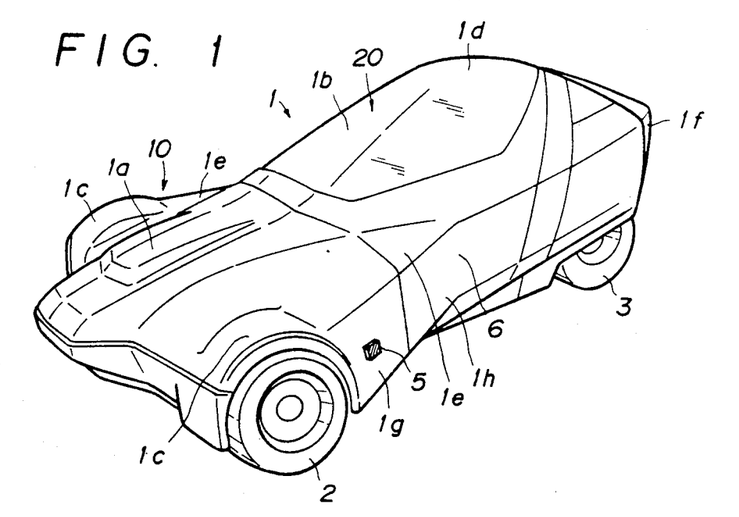
FIG. 1 is a perspective view of a three-wheeled motor vehicle according to the present invention.
Figure 2:
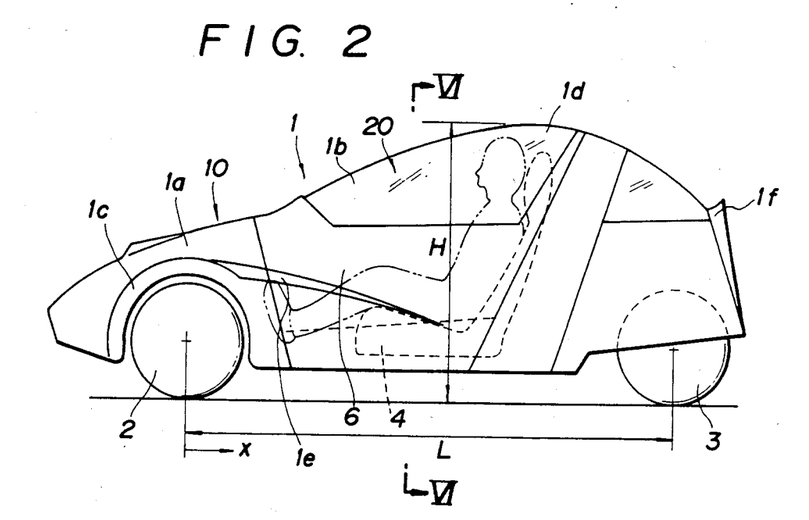
FIG. 2 is a side elevational view of the three-wheeled motor vehicle shown in FIG. 1.

FIGS. 1 through 4 show a three-wheeled motor vehicle according to the present invention. The three-wheeled motor vehicle includes a vehicle body 1 having a front engine room 10 and a rear driver's compartment 20. Two front wheels 2 and a single rear wheel 3 are rotatably mounted on the vehicle body 1. The engine room 10 is covered with an engine hood 1a disposed above an engine placed in the engine room 10 transversely centrally of the vehicle body 1 and a pair of front fenders 1c, 1c extending continuously from the engine hood 1a in opposite directions away from each other. The engine room 10 has therefore a wide flat configuration. The driver's compartment 20 is positioned behind the engine room 10 in contiguous relation thereto and is of a relatively small width substantially equal to that of the engine hood 1a. The driver's compartment 20 includes a roof 1b doubling as a windshield and progressively higher toward a highest roof portion 1d at a rear end portion of the vehicle body 1. Therefore, as shown in FIG. 2, the vehicle body 1 is substantially triangular in shape when viewed in side elevation to provide a necessary compartment space large enough for the driver seated on a seat 4 to sit and move therein for maneuvering the motor vehicle.

Figure 3:
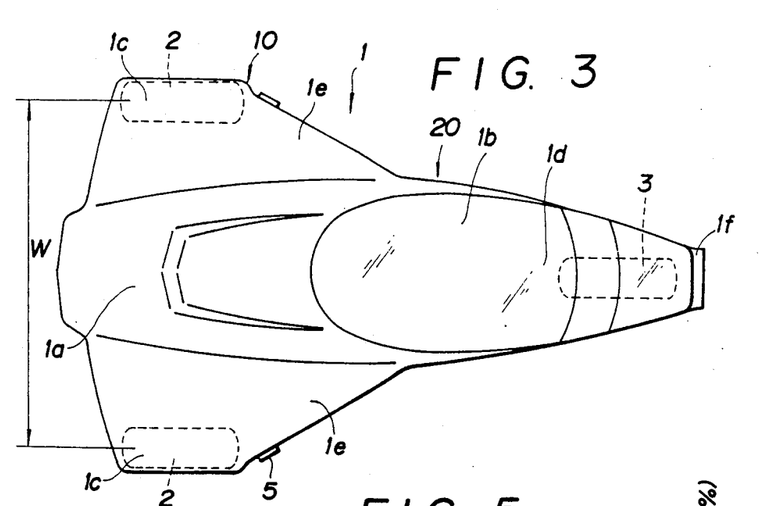
FIG. 3 is a plan view of the three-wheeled motor vehicle of FIG. 1.
Figure 4:
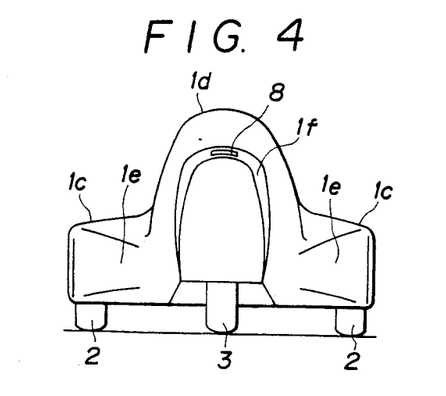
FIG. 4 is a rear elevational view of the three-wheeled motor vehicle of FIG. 1.

The driver's compartment 20 which is narrow itself includes front lateral wings 1e projecting away from each other and having surfaces blending into the surfaces of the front fenders 1c. The front fenders 1c and the front lateral wings 1e project laterally to a progressively lesser extent in the rearward direction of the vehicle body 1, and have contiguous side surfaces 1g, 1h, respectively, tapered progressively toward each other in the rearward direction of the vehicle body 1. Accordingly, as shown in FIG. 3, the front portion of the vehicle body 1 has a substantially triangular shape when viewed in plan to guide air streams to flow smoothly from the fenders 1c along the tapered side surfaces 1g, 1h of the front fenders 1c and the lateral wings 1e toward the rear end of the vehicle body 1. A reflector plate 5 is attached to the tapered side surface 1g of each front fender 1c to allow a light beam reflected by the reflector plate 5 to be seen by other drivers or observers in a wide space range from a position behind the motor vehicle to a position laterally of the motor vehicle.

With the engine room 10 and the driver's compartment 20 thus shaped, the transverse cross-sectional areas of the vehicle body 1 along a longitudinal axis thereof from the wide and flat front end portion to the narrow and highest portion remain substantially the same.

Figure 5:
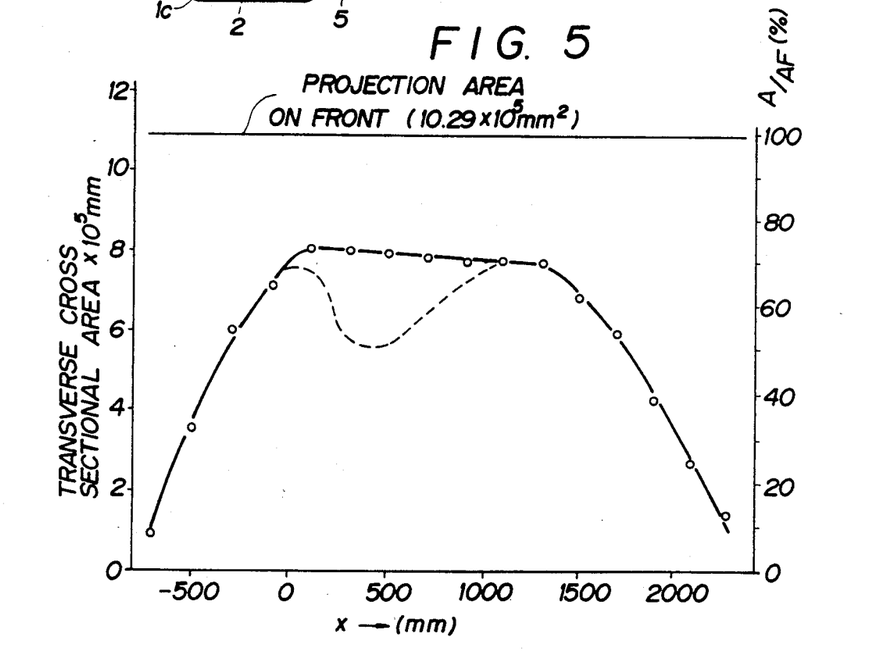
FIG. 5 is a graph of various transverse cross-sectional areas of the three-wheeled motor vehicle along a longitudinal axis thereof.

FIG. 5 is a graph showing various transverse cross-sectional areas of the vehicle body 1 of the three-wheeled motor vehicle shown in FIGS. 1 through 4 along the longitudinal axis thereof, with the wheel base being 2,200 mm, the tread between the front wheels 2, 2 being 1,300 mm, and the largest vehicle height H being 1,350 mm. The graph has a horizontal axis represented by the distance x from the axial center of the front wheel 2 in the direction of the arrow of FIG. 2 which is regarded as positive. The dotted-line curve in FIG. 5 is indicative of varying transverse cross-sectional areas of a vehicle body having no lateral wings behind front fenders.

Figure 9:
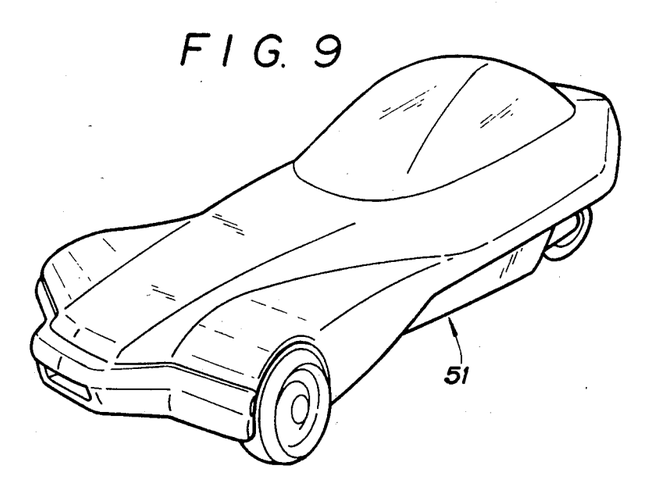
FIG. 9 is a perspective view of a three-wheeled motor vehicle constructed on the basis of the present invention for a wind-tunnel experiment.
Figure 10:
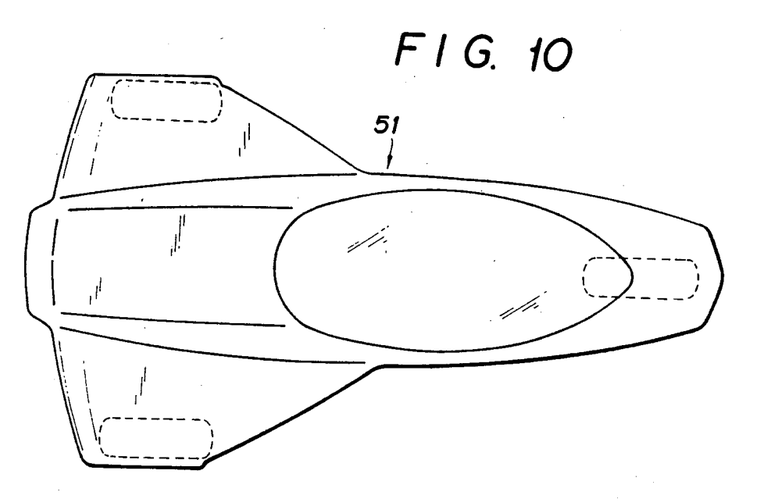
FIG. 10 is a plan view of the three-wheeled motor vehicle shown in FIG. 9.
Figure 11:
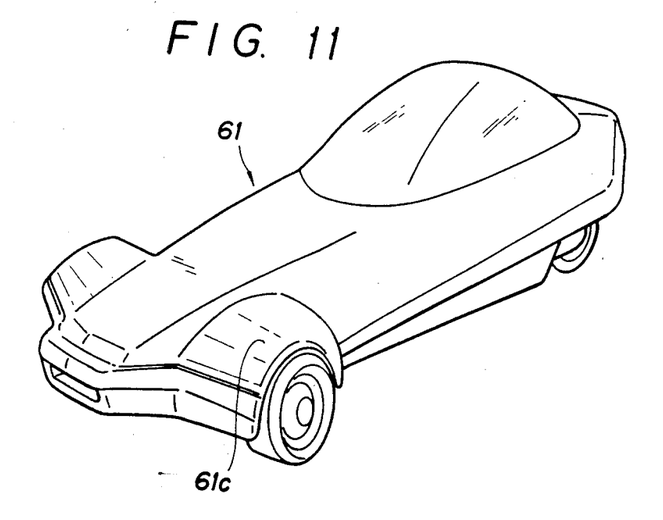
FIG. 11 is a perspective view of a three-wheeled motor vehicle according to a comparative example for a wind-tunnel experiment.
Figure 12:
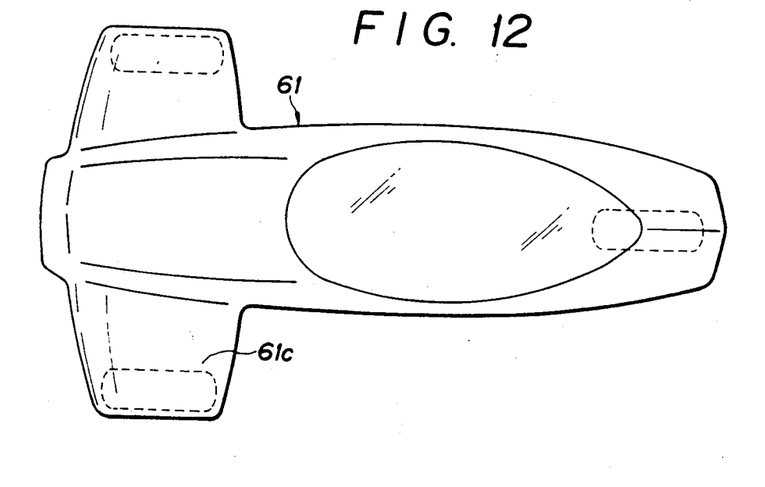
FIG. 12 is a plan view of the three-wheeled motor vehicle of FIG. 11.

FIGS. 9 and 10 illustrate a vehicle body 51 of a three-wheeled motor vehicle constructed according to the present invention for a wind-tunnel experiment. FIGS. 11 and 12 show a vehicle body 61 of a three-wheeled motor vehicle according to a comparative example for a wind-tunnel experiment for comparison with the vehicle body 51. The vehicle body 61 has front fenders 61c, but no lateral wings behind the front fenders 61c, with the result that the overall vehicle body 61 has a substantially T-shaped configuration when viewed in plan. A wind-tunnel experiment was conducted using the vehicle bodies 51, 61, and the result of the wind-tunnel experiment has indicated that the coefficient of air resistance of the T-shaped vehicle body 61 was 0.386 while that of the vehicle body 51 of the present invention was 0.313.

The smaller coefficient of air resistance results from the fact that an air stream flowing rearward from upper and side surfaces of the front fenders 1c is guided along the lateral wings 1e toward rear side surfaces of the vehicle body 1 without burbling or turbulence from the lateral wings 1e, thus reducing any resistance tending to cause the air current to burble or be turbulent from the sides of the vehicle body.

The vehicle body 1 had a projection area in front of $10.92 \times 10^5$ mm$^2$ which is the sum of the transverse cross-sectional area of the front portion of the vehicle body 1 and the transverse cross-sectional area of the upper half of a vehicle body rear portion. The transverse cross-sectional area of any portion of the vehicle body is much smaller than the frontal projection area. This, together with the fact that the transverse cross-sectional area of the vehicle body is rendered constant by the lateral wings 1e, results in the small coefficient of air resistance.

Figure 6:
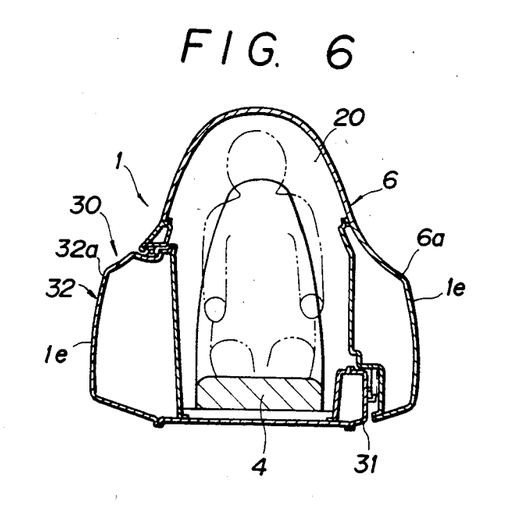
FIG. 6 is a cross-sectional view taken along line VI—VI of FIG. 2.
Figure 7:
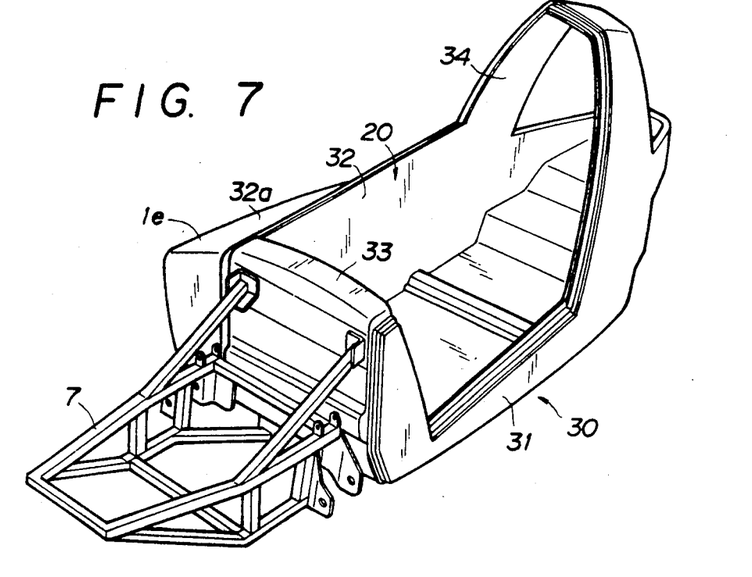
FIG. 7 is a perspective view of a monocoque construction having a driver's compartment.

As illustrated in FIGS. 6 and 7, a driver's compartment 20 comprises a box-shaped monocoque construction body 30 having a side sill 31 on one side, a relatively high side member 32 on the other side, a front toe board 33, and a rear pillar 34 extending between the side sill 31 and the side member 32. A gull-wing door 6 is hinged to an upper edge of the side member 32 so that the driver's compartment 20 will be opened on one side thereof. The lateral wings 1e are formed by laterally bulging outer panels 32a, 6a of the side member 32 and the door 6, respectively.

Figure 8:
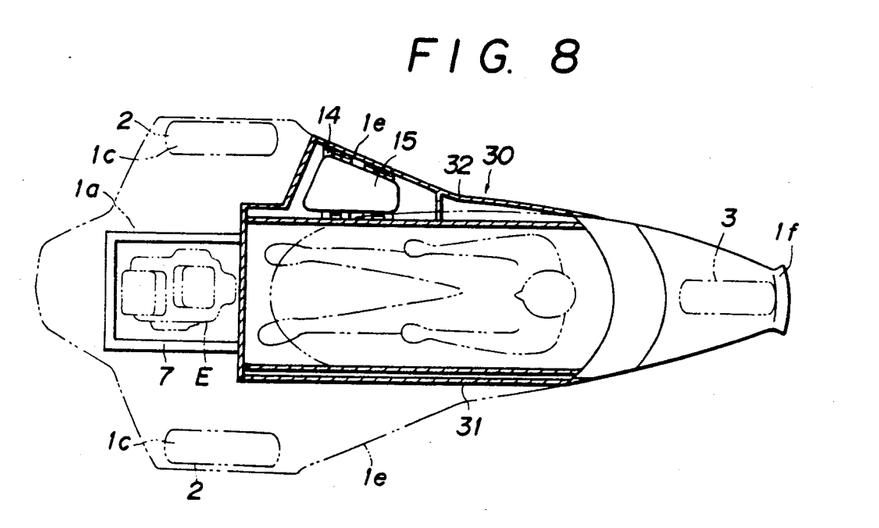
FIG. 8 is a schematic plan view, with parts in cross section, of a vehicle body with the monocoque construction assembled therein.

As shown in FIG. 8, a fuel tank 15 is mounted by mounts 14 in a large interior space in the lateral wing 1e on the side member 32. Thus, the fuel tank 15 is housed in the side member 32 of the monocoque construction 30 for effective space utilization therein. Moreover, with the fuel tank 15 disposed in a front portion of the side member 32, rather than below the rear floor portion of the vehicle body of a conventional motor vehicle, the center of gravity of the motor vehicle is displaced forward which can assist in improving cornering characteristics under appropriate circumstances. Designated in FIGS. 7 and 8 by the reference numeral 7 is a mount frame for an engine E on a front end of the monocoque construction 30 in front thereof. Designated in FIG. 4 by the reference numeral 8 is an air ventilation hole defined in a rear spoiler 1f on the rear end of the vehicle body 1 and communicating with the space in the driver's compartment.

Figure 13:
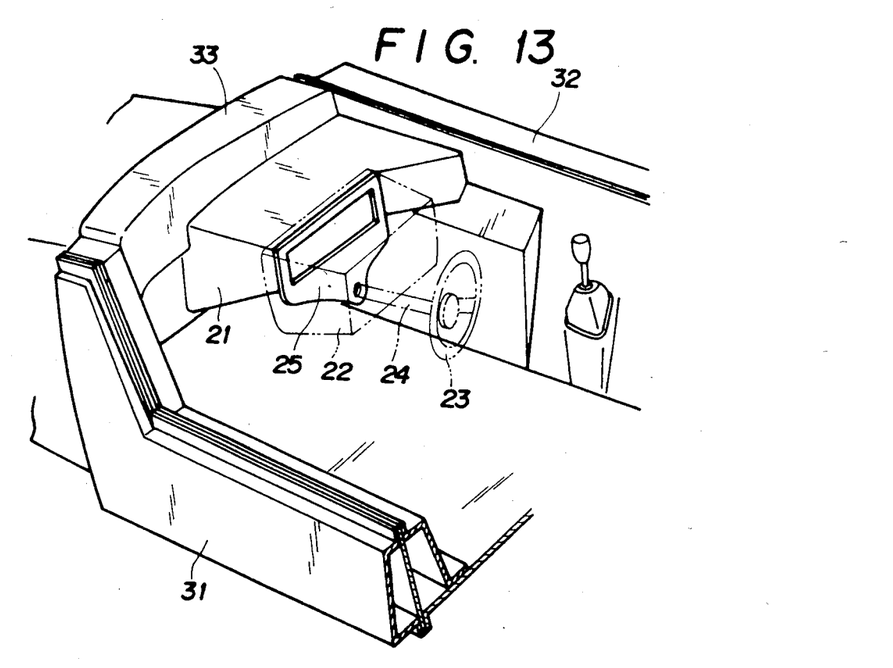
FIG. 13 is a perspective view of a steering column support construction in a front portion of a driver's compartment in the vehicle of the present invention.

In FIG. 13, to the toe board 33 on the front end of the monocoque construction 30, there is attached a support frame 21 for an instrument panel 22 on which various meters are installed. A steering column 24 through which a steering shaft connected to a steering wheel 23 extends is supported by a bracket 25 on the support frame 21. The support frame 21 has a lateral end fixed to the side member 32. The toe board 33, the side member 32, and the support frame 21 attached therebetween jointly constitute a truss for supporting the steering column 24 on the support frame 21 with an increased degree of rigidity.

Figure 14:
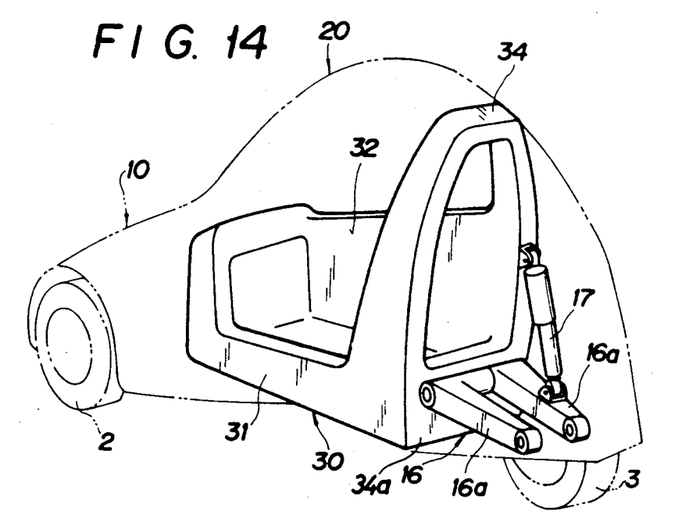
FIG. 14 is a perspective view of the vehicle, showing a rear wheel suspension.

FIG. 14 illustrates a suspension for the rear wheel 3. The rear wheel 3 is rotatably supported by a rear fork 16 having a pair of laterally spaced fork members 16a, 16a pivotally mounted on a lower rear end 34a of the rear pillar 34 of the monocoque construction 30. The suspension includes a dampening member or shock absorber 17 having one end connected to one of the fork members 16a and an opposite end to a rear end of the side member 32. Although the weight of the vehicle body 1 acts on the righthand side (as shown in FIG. 14) of the monocoque construction 30 due to reactive forces from the dampening member 17, the relatively high side member 32 at the righthand side of the monocoque construction 30 has a large section modulus against a vertical bending moment, so that the weight of the vehicle body 1 can reliably be borne by the monocoque construction 30. The side member 32 may be of a hollow shape which is light in weight. Accordingly, it is not necessary to reinforce the monocoque construction 30 with separate stiffener members, and hence the vehicle body 1 is light in weight and of a simple structure.

Figure 15:
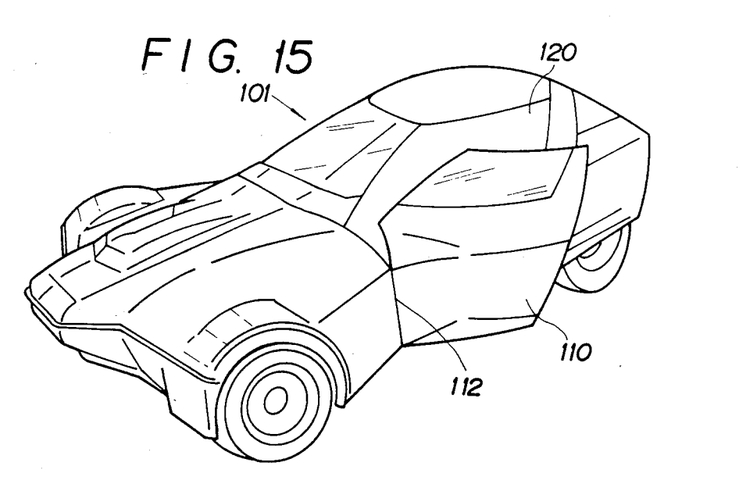
FIG. 15 is a perspective view of a modified three-wheeled motor vehicle of the present invention, having a laterally openable door.
Figure 16:
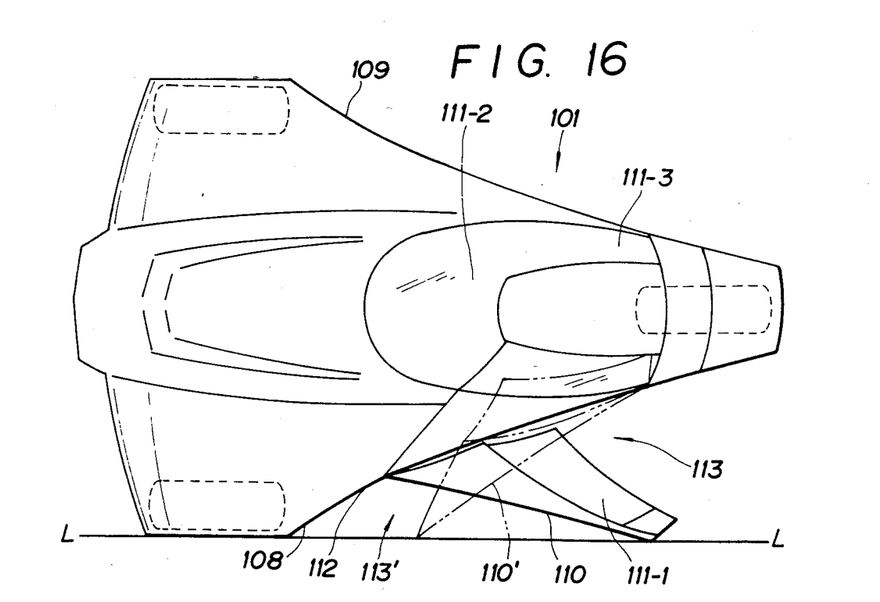
FIG. 16 is a plan view of the three-wheeled motor vehicle illustrated in FIG. 15.

FIGS. 15 and 16 illustrate a three-wheeled motor vehicle according to another embodiment of the present invention, the motor vehicle having a laterally openable door. As shown in FIG. 16, the motor vehicle has a vehicle body 101 including lateral slanted sides 108, 109 progressively converging toward the central axis of the vehicle body 101 from a wider front portion to a rear narrower portion thereof. A laterally openable door 110 is hinged to one of the slanted sides, that is, the lefthand side 108 in the illustrated embodiment. The door has a window 111-1, and the vehicle body 101 also has a front window 111-2 and a righthand window 111-3. These windows 111-1, 111-2, 111-3 jointly constitute a continuous window surrounding a driver's compartment 120 and extending from a front to lateral sides of the driver's compartment 120 when the door 110 is closed, as shown in FIG. 16. Although in the illustrated embodiment the door 110 is provided on the lefthand side of the vehicle body 101, two separate doors may be hinged to the opposite sides of the vehicle body 101.

The door 110 has a hinge 112 on a front edge thereof at a wider vehicle body portion and is openable away from a narrower vehicle body portion. As a consequence, when the door 110 is opened to the lateral extent which does not exceed a line L—L passing through the outermost edge of the front fender parallel to the longitudinal axis of the vehicle body 101, the door 110 provides a large opening 113 opening rearward to allow the driver to get easily into or out of the driver's compartment 120. FIG. 16 also shows an imaginary position 110' that would be assumed by an opened door hinged at its rear edge to the narrower vehicle body portion. With such a door arrangement, when the door would be opened to the line L—L, the size of an opening 113' formed by the door would be extremely small because of the laterally projecting side 108, and hence the door would have to be opened largely beyond the line L—L to permit the driver to get smoothly into and out of the driver's compartment 120.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A three-wheeled motor vehicle comprising:
   (a) a vehicle body;
   (b) two front wheels rotatably mounted on said vehicle body;
   (c) a single rear wheel rotatably mounted on said vehicle body;
   (d) an engine disposed on said vehicle body between said front wheels;
   (e) a driver's compartment defined in said vehicle body;
   (f) said vehicle body including a front portion covering said engine and said front wheels and a rear portion disposed behind said front portion and covering said compartment and said rear wheel, said front portion having a relatively wide and flat shape and said rear portion being narrower than said front portion and progressively higher in a rearward direction for a substantial proportion of said rear portion; and
   (g) said vehicle body also including lateral wing portions on each side extending longitudinally rearwardly from behind the front wheels and tapering into said rear portion for causing the said vehicle body to have a substantially constant cross-sectional area throughout a substantial proportion of both said front and rear portions and the transition between said front and rear portions for producing an aerodynamically improved vehicle body shape.

2. A three-wheeled motor vehicle according to claim 1, wherein said front portion comprises an engine hood covering said engine thereover and a pair of front fenders projecting laterally from said engine hood over said front wheels, and said lateral wing portions are disposed behind said front fenders in contiguous relation thereto.

3. A three-wheeled motor vehicle according to claim 2, including light reflectors mounted on said side surfaces of said front fenders.

4. A three-wheeled motor vehicle according to claim 1, wherein said rear portion comprises a monocoque construction having on at least one side thereof a relatively high side member extending longitudinally of said vehicle body, said side member being hollow and housing a fuel tank therein.

5. A three-wheeled motor vehicle according to claim 4, wherein said fuel tank is disposed in a front portion of said side member.

6. A three-wheeled motor vehicle according to claim 1, wherein said rear portion of said vehicle body has on at least one side thereof a laterally openable door having a hinge connected to said front portion of said vehicle body.

7. A three-wheeled motor vehicle according to claim 1, wherein said rear portion of said vehicle body comprises a monocoque construction having a relatively high side member on one side thereof and an openable and closable door on at least an opposite side thereof, said lateral wing portions being formed on outer panels of said side member and said door, respectively.

* * * * *